June 10, 1941.  A. L. MEROLLE  2,245,042

APPARATUS FOR FORMING RECEPTACLE SCREW CAPS

Filed Feb. 15, 1936  5 Sheets-Sheet 1

A. L. Merolle INVENTOR.
BY Thomas Howe
ATTORNEY.

June 10, 1941.   A. L. MEROLLE   2,245,042
APPARATUS FOR FORMING RECEPTACLE SCREW CAPS
Filed Feb. 15, 1936   5 Sheets-Sheet 2

INVENTOR.
A. L. Merolle
BY Thomas Howe
ATTORNEY.

June 10, 1941.　　　A. L. MEROLLE　　　2,245,042
APPARATUS FOR FORMING RECEPTACLE SCREW CAPS
Filed Feb. 15, 1936　　　5 Sheets-Sheet 4

*A. L. Merolle* INVENTOR.
BY *Thomas Howe*
ATTORNEY.

June 10, 1941. A. L. MEROLLE 2,245,042
APPARATUS FOR FORMING RECEPTACLE SCREW CAPS
Filed Feb. 15, 1936 5 Sheets-Sheet 5
FIG. 9
FIG. 10    FIG. 11
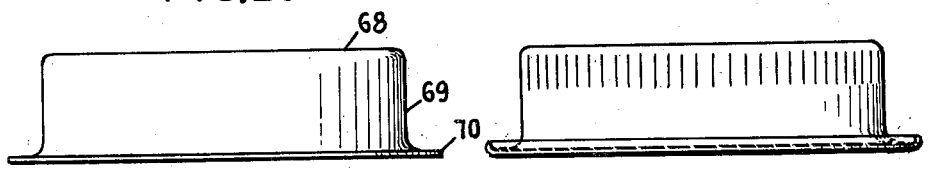
FIG. 12    FIG. 13
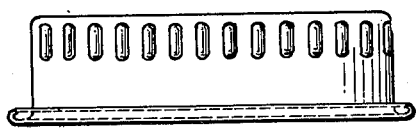 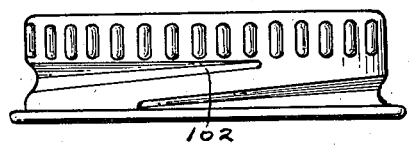
FIG. 14
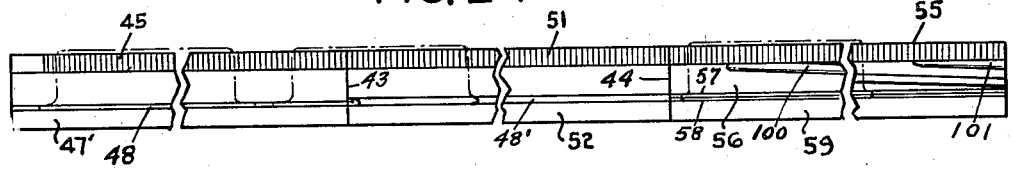
FIG. 15    FIG. 16
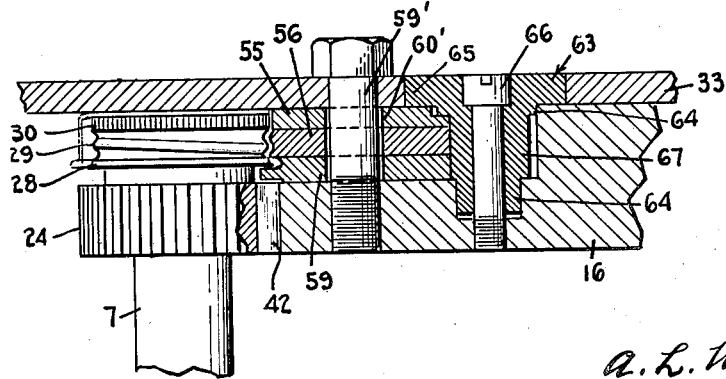 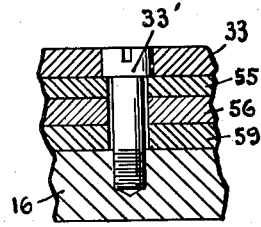
A. L. Merolle INVENTOR.
BY Thomas Howe
ATTORNEY.

Patented June 10, 1941

2,245,042

UNITED STATES PATENT OFFICE 2,245,042

APPARATUS FOR FORMING RECEPTACLE SCREW CAPS

Augustus L. Merolle, Brooklyn, N. Y., assignor to Empire Metal Cap Co. Inc., Brooklyn, N. Y., a corporation of New York Application February 15, 1936, Serial No. 64,034

4 Claims. (Cl. 153—72)

The present invention relates to apparatus for forming screw caps adapted to act as receptacle closures.

One main object of the present invention is to provide an improved means whereby screw caps for receptacles may be efficiently and accurately manufactured.

A further and ancillary object of the invention is to provide rotary apparatus having a horizontal axis whereby the apparatus is less liable to distortion.

A further object of the invention is to provide an improved means for forming screw caps wherein the parts of the cap are securely held during the thread forming operation whereby the caps are accurately formed.

A further object of the invention is to provide an adjustment whereby the relation of the cap forming members may be accurately secured and the parts firmly held in their adjusted positions whereby the caps are accurately formed.

A further and more specific object of the invention is to provide eccentric members for securing the adjustment of the cap forming die members with relation to each other.

Other and ancillary objects of the invention will appear hereinafter.

In the accompanying drawings which illustrate the invention:

Fig. 9 is a developed face view of the stationary thread forming die which co-operates with the mandrels to form the thread.

Fig. 10 is a side elevation on an enlarged scale of the hat-shaped sheet metal blank from which the cap is formed.

Fig. 11 is a similar view of the blank after it has passed the first die sections in which the knurling is partly performed and the rim is partially curled.

Fig. 12 is a similar view after the cap has passed through the second section of dies wherein the knurling is completed and the marginal flange of the skirt has been rolled or wired.

Fig. 13 is a side elevation of the completed cap with the thread formed therein.

Fig. 14 is a developed face view of the stationary die members which co-operate with the mandrels to form the cap.

Fig. 15 is an enlarged view, partly broken away, of a portion of the section of Fig. 2 but with the mandrel shown in elevation; and Fig. 16 is a section on the same scale as Fig. 15, partly broken away, on the line 16—16 of Fig. 1.

Figure 1:
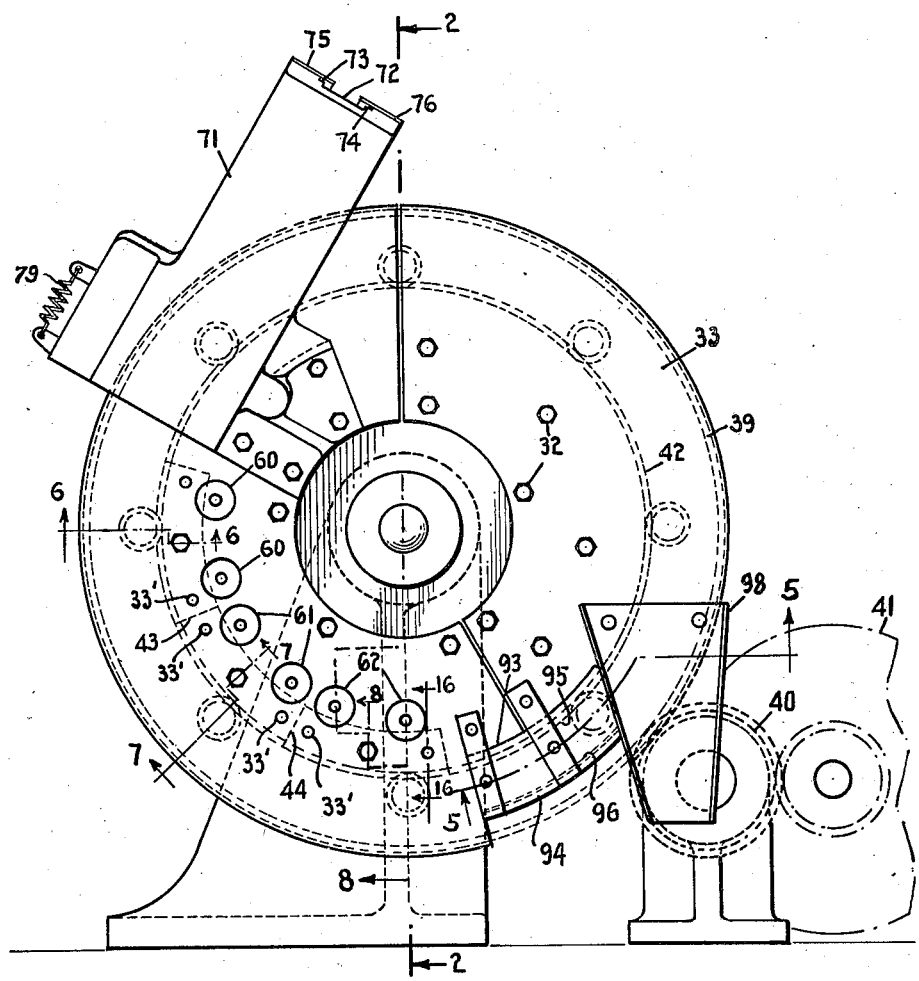
Fig. 1 is a side elevation of apparatus embodying the invention of apparatus.

Referring to the drawings, the apparatus comprises a supporting pedestal 1 within which is fixed the horizontal arbor 2 which has the collar 3 bearing against the pedestal at one side, the pedestal being clamped between this collar and the nut 4 screw threaded on the arbor. Also the arbor is held against rotation by means of the key 5. Mounted to rotate upon the arbor 2 is a carriage 6 for the mandrels 7 for rotatably supporting the cap blanks 8 to be operated upon. The carriage 6 has a central boss 9 between which and the arbor 2 are inserted a plurality of separated sets of roller bearings 10 whereby the carriage is rotatably mounted upon the arbor. By reason of the plurality of separated sets of bearings and the lengthening out of the bearing area by reason of the boss at the central part of the carriage the carriage is firmly mounted in position so that the bearing of the carriage upon the arbor may be made practically at the arbor, whereby the construction is much simplified, improved and facilitated, and at the same time the carriage will be so firmly held in position that there will be no such distortion as to appreciably affect the position of the mandrels although the bearing is much closer to the axis of the apparatus than it is to the mandrels.

The firmness and stability of the carriage and the fixity of the position of the mandrels is also aided by the fact that the axis of rotation of the carriage is horizontal rather than vertical, whereby the weight of the carriage and its carried parts has practically no leverage tending to distort the carriage whereby the mandrels may be thrown out of proper adjustment. Between the collar 3 and the bearings 10 is an end collar 11 for the bearings having a gasket or packing 12 for preventing grease from escaping from the bearing. A screw collar 13 screwed on the arbor 2 serves to adjustably hold the roller bearings in position. This screw nut also has the circumferential gasket or packing 14 to prevent escape of grease from the bearing and the screw collar 13 is held in its suitable position of adjustment by a screw pin 15 screwed into the plate 16 which is stationary, being fixed upon the shaft by means of a nut 17 which serves to clamp the plate 16 between it and a shoulder 18 on the arbor 2. The plate 16 is also prevented from turning on the arbor by means of a key 19.

Mandrels 7 are equally spaced circumferentially about the circular carriage 6 and each mandrel 7 is rotatably mounted in an opening 20 in the carriage 6 by means of a plurality of sets of roller bearings 21 and 22. Each of these mandrels has the bearings secured in place between a plate 23 bearing against the hub of a spur gear 24 and a plate 25 which is adjustably secured in place by a nut 26 screw threaded upon the spindle and the nut and end of the spindle to which it is secured are covered by a housing or cap 27 secured to the carriage 6.

Beyond the spur gear 24 are three generally circular plates adapted to act upon the cap in its formation, the lowermost plate 28 co-operating with a stationary die to form the wire edge at the marginal portion of the cap skirt, the next plate 29 having a thread which in co-operation with a stationary die forms the thread and the plate 30 which in co-operation with the stationary means operates to knurl the cap skirt near the top. These plates 28, 29 and 30 are clamped fixedly to the mandrel by means of a screw 31.

Detachably fixed to the stationary plate 16 by screws 32 is a cover and retaining plate 33 which extends in close proximity to caps mounted on the mandrels and thereby prevents the caps from jumping off the mandrels and this plate also serves as a cover to close the exterior casing of the apparatus.

The carriage 6 has its circumference provided with gear teeth 39 through which the carriage is rotated by means of the gear 40 meshing with the gear teeth 39 and which is driven by a suitable motor 41. The mandrel gears 24 mesh with gear teeth 42 upon the circumference of the fixed plate 16 so that as the carriage 6 is rotated about the axis of the arbor 2 the mandrels will be rotated about their respective axes by reason of the engagement of their gears 24 with the circumferential gear 42 upon the outer circumferential edge of the plate 16.

The die faces upon the stationary plate 16, with which the plates 28, 29 and 30 of the mandrels co-operate to form the caps, are in three sections divided along the lines 43 and 44. The extreme counter clock-wise (Fig. 1) section comprises the plate 45 having the corrugated or knurled face 46 opposite the knurled or corrugated face 47 on the mandrel plates 30; this section also comprises the plate 47' having the round bottomed groove 48 for the reception of the flange 48' of the cap blank. The plates of a section are clamped to the stationary plate 16 by a screw 49, there being a clearance 50 between the plates and the screw to permit adjustment as will be hereinafter referred to. The next section in a counter-clockwise (Fig. 1) direction is made up of the plate 51 similar to the plate 45 and having a similar knurled face co-operating with the knurled face of the mandrel plate 30. The section also comprises the plate 52 similar to the plate 47'. These plates 51 and 52 are clamped to the stationary plate 16 by means of the screws 53 there being clearance 54 between the plate and the sides of the screw for purposes of adjustment as will be hereinafter referred to. The next section in a counter-clockwise (Fig. 1) direction is made up of the plate 55 similar to the plates 45 and 51, a plate 56 having screw threads or ribs upon its working face adapted to co-operate with the mandrel plate 29 to form the thread in the cap, this plate 56 having a rabbet or recess 57 in the lower edge of its working face which co-operates with another rabbet or groove 58 in a plate 59 to form a groove with a rounded bottom within which lies the roll edge of the cap. These plates 55, 56 and 59 are releasably clamped to the stationary plate 16 by means of the screws 59' about which there is a clearance 60' in the holes of the plates 55, 56 and 59 to permit movement of the plates with relation to the screws when the screws are loosened.

Each of the plates 47', 52 and 59 projects beneath the mandrel plates 28 and forms a close joint therewith so that there will be no danger of the material of the cap being forced therebetween but such material is confined to its appropriate recess.

To provide for the adjustment of the sections including the plates 45, 51 and 55 respectively, there are provided camming bushings. Thus for the section comprising the plate 45 there are two of such devices 60, for the section comprising the plate 51 there are two such devices 61 and for the section comprising the plate 55 there are two such devices 62. These devices are all alike so that a description of one of them will be a description of each. Thus referring to Fig. 15 wherein for example is shown one of the cam adjustment devices 62, the cam bushing 63 is rotatable on bearings 64 in the plate 16, these bearings being concentric with the axis of the bushing. Also the head 65 of the bushing fits within a circular opening in the plate 33 the periphery of which is concentric with the axis of the bushing. The screw 66 engaging with the stationary plate 16 serves to releasably clamp the bushing 63 in any adjusted position. The body 67 of the bushing 63, which is between the bearings 64, is eccentric in relation to the axis of the bushing and consequently as it is turned will constitute an adjusting means or a stop for causing the plates 55, 56 and 59 to be adjusted closer to or further away from the mandrel 7, releasing of the screw 59' and the clearance 60' about it permitting the plates to be adjusted under the influence of the turning of the cam or eccentric 67. When the desired adjustment of the die plates has been effected the bushing 63 is fixed in position by screwing up the screw 66 with the surface of the eccentric against the backs of the plates and the screw 59' is tightly screwed up. The plates are thus not only held by the clamping effect of the screws 59' but are backed up by the face of the eccentric so that they are firmly held in adjusted position without danger of being thrown out of adjustment.

The cap blanks as fed to the machine are of sheet metal (see Fig. 10) comprising the circular top 68 from which depends the side portion or skirt 69, the lower edge of which is turned outwardly to form the flange 70 so that this cap blank may be said to be hat-shaped.

To feed the caps continuously to the machine a chute 71 (Figs. 1, 3 and 4) secured to a stationary part of the machine is provided, having the cap blank channel 72 with the side rabbets 73 and 74 for receiving the flanges of the caps and the plates 75 and 76 overlapping the cap flanges to hold them in the chute. Normally the progress of the cap downwardly along the chute is arrested by means of one end of a lever 77 which projects into the path of the cap and is pivoted on the chute at 78, the opposite end of the lever having secured to it one end of a spring 79, the other end of the spring being secured to a bracket 80 upon a stationary part of the machine. This spring tends to normally hold the end of the lever into the cap path. Pivotally secured to the lever 77 is a link 81 which is also pivoted to one arm of the bell crank lever 82 pivoted upon the chute at 83 and at its other ends is rotatably mounted a roller 84 which projects into the path of the mandrels 7 so that as the mandrels are carried past the roller 84 by the rotation of the carriage 6 the roller will be deflected. The axis of the roller 84 is substantially parallel to the axes of the mandrels. The deflection of the roller 84 as stated will turn the arm 82 about its pivot 83 thereby pushing the link 81 endwise and turning the lever 77 against the tension of the spring 79 out of the path of the cap. This will permit the cap resting against it to drop into a lower position (see Fig. 3) against the face 91 on the lever 86.

The lever 86 is pivoted to the chute 71 at 87 and is normally held against the stationary stop pin 89 by means of a spring 90. When so held the nose 91' of the cam is withdrawn from the path of the cap dropping after release by the arm 77. The tail 88 of the lever 86 projects into the path of the cap fed onto the mandrel, the lower cap 68 shown in Fig. 3 being in position where the mandrel has passed beneath it and engages with one side of the cap, the path of the mandrels being as indicated by the line 77'. The mandrel passes under the rear side of the cap and engages with its forward side because of the fact that the cap, as it is fed in from the chute, stands at an angle with the plane of movement of the mandrel. The mandrel having thus passed beneath the cap and continuing its movement, will draw the cap down under the plate 33 whereupon the axis of the cap becomes coincident with that of the mandrel (see Figs. 2, 6, 7, 8 and 15) and so passes on to the operations of knurling, threading and curling its lower edge.

Figure 3:
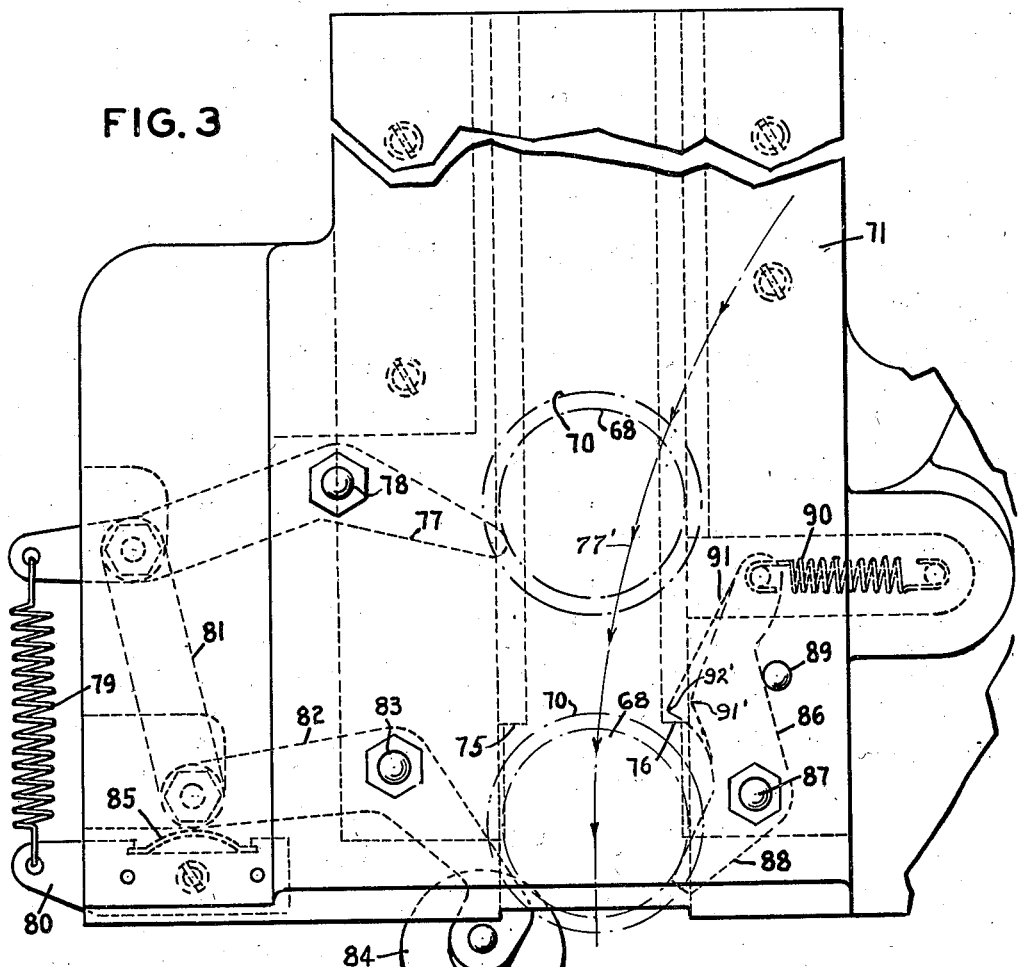
Fig. 3 is a side elevation, partly broken away, on an enlarged scale, of the feeding chute for feeding the caps to the apparatus.
Figure 4:
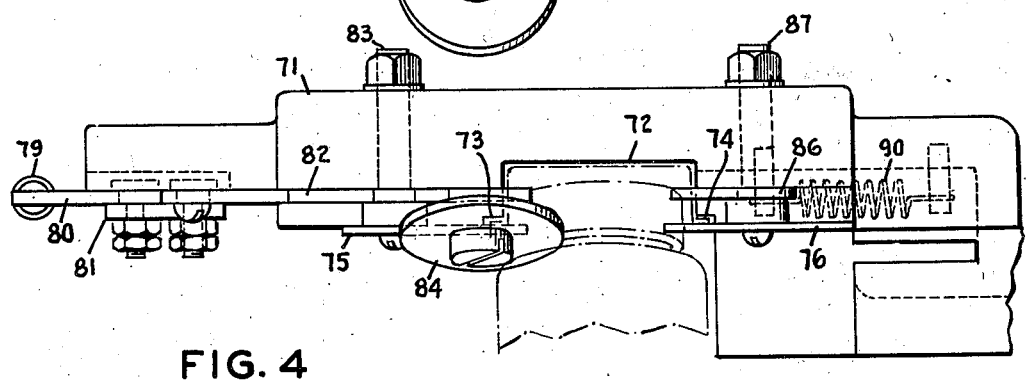
Fig. 4 is a bottom plan view of the apparatus as shown in Fig. 3 and drawn to the same scale.
Figure 6:
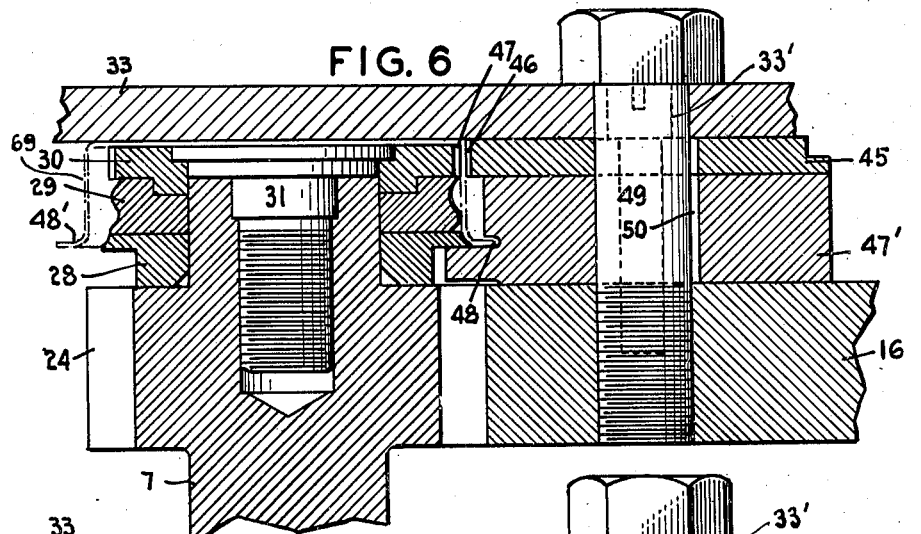
Fig. 6 is a section partly broken away, on an enlarged scale, on the line 6—6 of Fig. 1.
Figure 7:
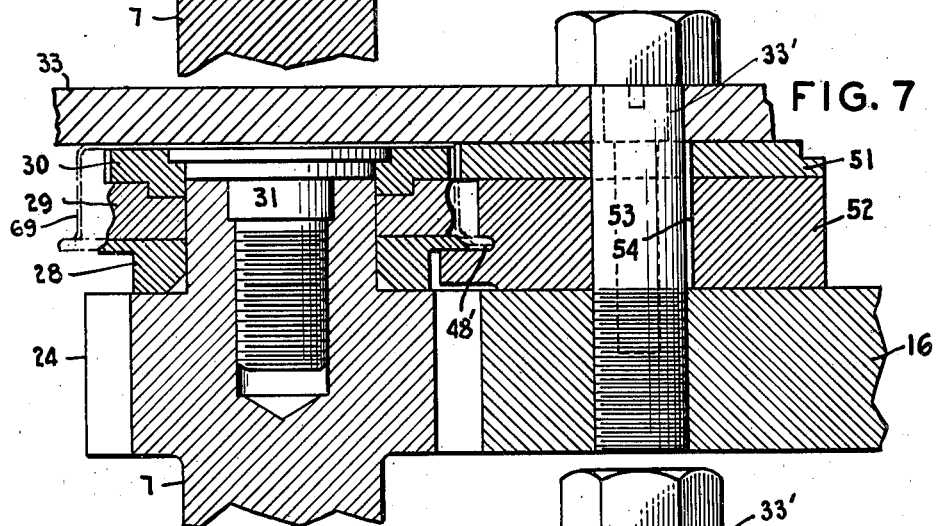
Fig. 7 is a section partly broken away on the same scale as Fig. 6 on the line 7—7 of Fig. 1.
Figure 8:
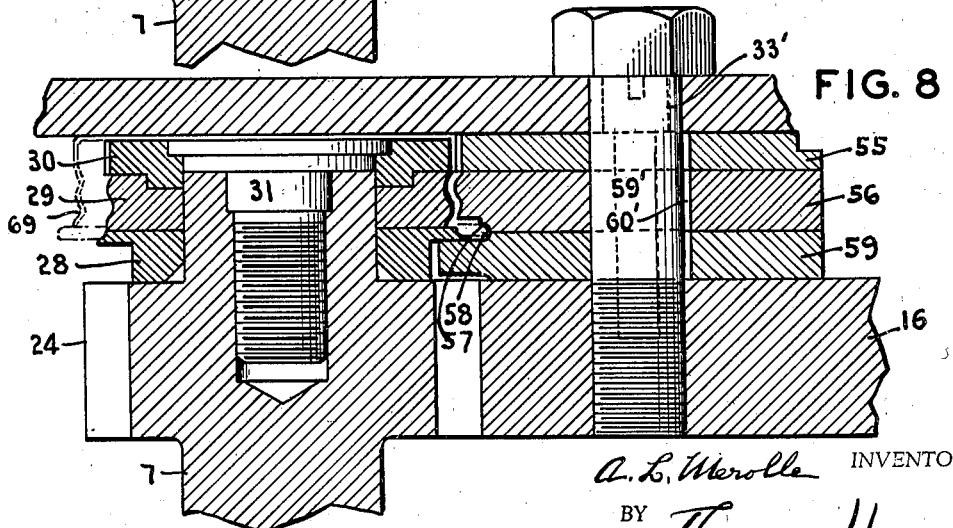
Fig. 8 is a section to the same scale as Figs. 6 and 7, partly broken away, on the line 8—8 of Fig. 1.

As the mandrel thus draws the cap forward from the position as shown in Fig. 3, the mandrel deflects the roller 84 outwardly and thus withdraws the end of the arm 77 from the path of the caps coming down the chute. This results in the feeding downwardly by gravity of the cap previously held by the arm 77. This might however result in the cap just released from the arm 77 falling down so that its flange would overlap the flange of the cap being drawn in beneath the plate 33 by the mandrel. This might result in bending and deformation of either or both the flanges by the action of the cap on the mandrel changing from a position inclined to the path of the mandrel to one having its axis perpendicular thereto as above referred to. The following cap is however prevented from coming into contact with or overlapping the cap being drawn in by the mandrel because as the cap on the mandrel is drawn in beneath the plate 33 it deflects the tail 88 of the lever 86 outwardly thereby throwing the nose 91' into the position 92' where it projects into the path of the following cap and arrests such cap before it can fall into dangerous proximity to the cap being drawn in by the mandrel. When however the cap on the mandrel has passed into the apparatus and past the tail 88 the spring 90 will withdraw the nose 91' from the cap path and the cap held by it will drop into the lowermost position where it is adapted to be engaged by a mandrel and drawn in beneath the plate 33. At the same time however that the nose 91' is withdrawn from the cap path, the roller 84 will have passed the mandrel and consequently the arm 77 will be projected into the cap path and arrest the series of caps above it. The drawing-in of this new lowermost cap will result in the release of a cap by the arm 77 which will drop down on the nose 91' which is projected into the cap path and after the passage of the lowermost cap into the machine the nose 91' will be withdrawn so as to permit another cap to drop into the mandrel engaging position, the arm 77 being practically simultaneously projected into the path of the succeeding caps and this cycle is repeated indefinitely, the caps being fed into mandrel engaging position one at a time and without danger of succeeding caps coming into injurious relation to the cap being drawn into the machine by the mandrel.

It will be observed that the cap blank is somewhat larger than the mandrel so that it may be readily placed upon and removed therefrom and also that the cap when in mandrel engaging position is beyond the ends of the retaining strips or plates 75 and 76 so that it is free to pass down onto the mandrel, the direction of movement of the mandrels being as indicated by the arrows of the line 77' in Fig. 3, this being a counter-clockwise movement as viewed in Fig. 1.

To provide a resilient cushioning stop for bringing the arm 77 to rest in proper position without shock, a buffer spring 85 upon a suitable stationary part is provided.

Figure 5:
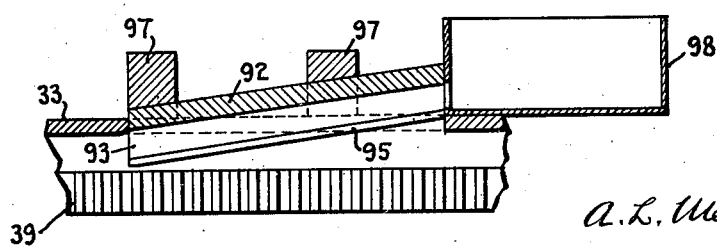
Fig. 5 is a section on the line 5—5 of Fig. 1 on an enlarged scale.
Figure 2:
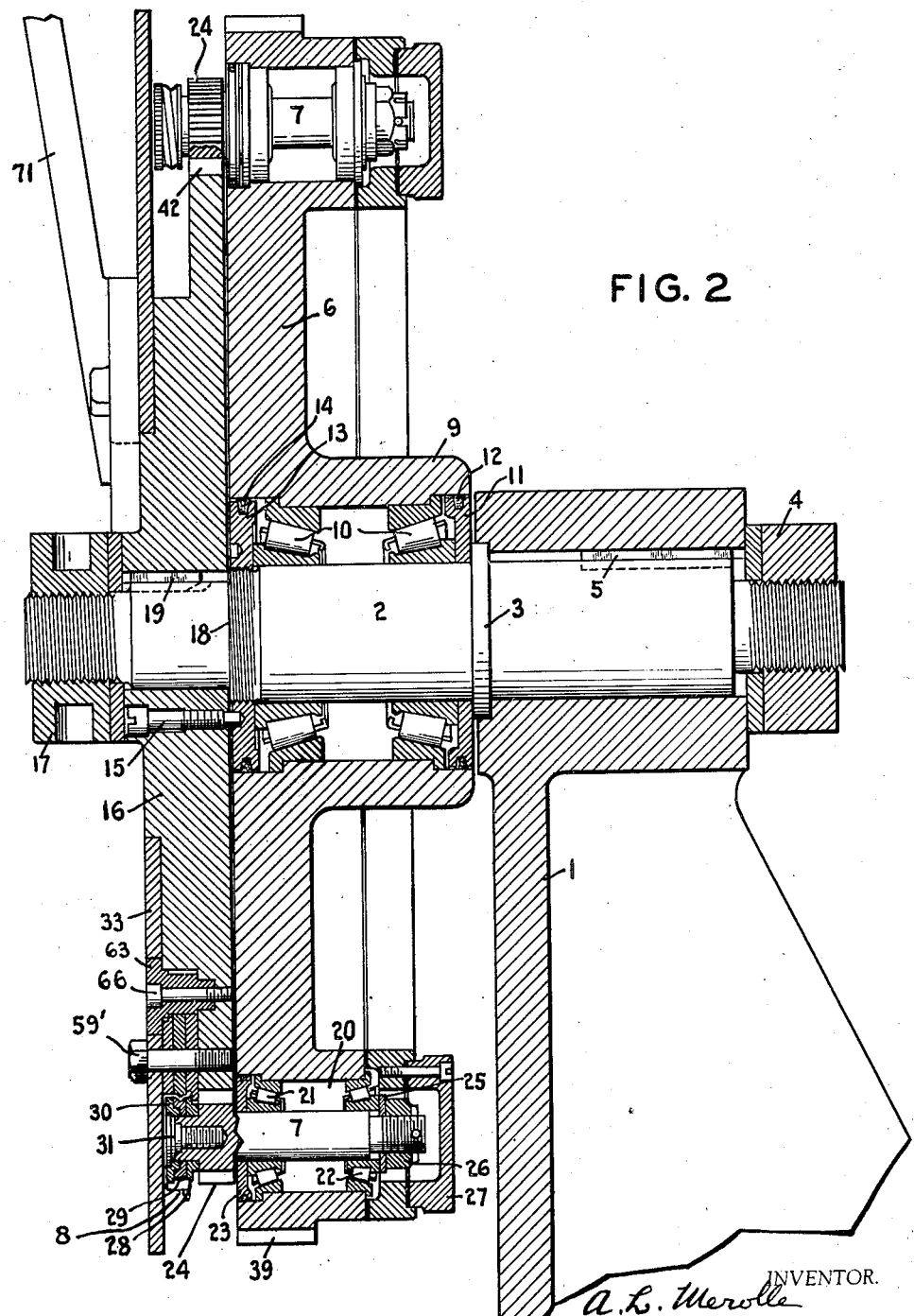
Fig. 2 is a section on the line 2—2 of Fig. 1 on an enlarged scale.

After the caps have been successively fed to the mandrels and have been knurled, their edges wired or rolled and the thread formed it is necessary to remove the caps from the machine. Accordingly a discharge chute is provided having the back 92 and the sides 93 and 94 from the lower edges of which are the inwardly projecting ledges 95 and 96. This chute is secured to the stationary part of the machine by strips 97, the chute being inclined (see Fig. 5) and the lower end of the chute being in such position that the ledges 95 and 96 will engage beneath the rims of the completed caps as they are positioned on the mandrels, the mandrels passing between the ledges whereby the caps will be lifted from the mandrels and forced up the inclination of the chute as the mandrels pass and will thence pass into the discharge hopper 98 from which they may be deposited in any suitable receptacle.

In the operation of the apparatus the carriage 6 will be rotated about its horizontal axis, carrying the mandrels 7 which, as the carriage rotates, are also caused to rotate about their respective axes by reason of their geared engagement with the gear upon the periphery of the stationary plate 16. It will be seen that the mandrels will thus be successively presented to the delivery end of the chute 71 and that the successive caps, each being of an internal diameter considerably larger than the mandrels upon which they are placed so that each cap will readily pass into position upon the mandrel and can be removed therefrom after its formation, are fed from the chute to the mandrels in the manner as before described. Having been fed into position upon the mandrel the cap and mandrel are carried in a counter-clockwise (Fig. 1) direction toward the stationary die plates with which the mandrel co-operates. The mandrel with the cap thereon, being rotated as described, will first roll along the first section of die plates, the knurling teeth or projections 47 upon the mandrel plate 30 sandwiching with the similar teeth upon the stationary plate 45 will form slight knurling indentations as shown in Fig. 11. This knurling however will be superficial as compared with the final knurling as the plate 45 will be adjusted a comparatively greater distance from the knurling face of the mandrel so that the knurling indentations will not be so deep as in their final form. During the passage of this first section the flange 70 of the blank passes through the round bottom groove 48 in the plate 47'. In passing this die section the flange is partially curled, as shown in Fig. 11, in the groove 48 and the cap is superficially knurled as referred to. In passing the next die section the plate 51 is adjusted further outwardly than the plate 45 whereby the knurling teeth upon the mandrel and the plate interengage so as to deepen the knurling grooves. Also the stationary plate 52 has its face closer to the mandrel than the plate 47' of the preceding section whereby the clearance between the edge of the plate 28 and the bottom of the groove 48' is decreased, which causes the flange of the blank to be further bent upwardly and inwardly by the curved bottom of the groove so that as the cap reaches the end of this second die section there will be formed upon it the further formed knurling and also the flange or rim of the cap will be further curled toward a wired or beaded edge. It will be observed that the edge of the plate 28 engaging the blank is concaved or bevelled so as to fit the curve between the cylindrical portion of the cap skirt and the flange thereof. In the third die section the stationary and mandrel knurling plates 55 and 30 are more closely relatively adjusted than in the next preceding section so that the knurled teeth are deepened into their final condition. The plate 56 has formed upon it the threads or ribs 100 and 101 adapted to intermesh and co-operate with a similar spiral rib or thread upon the mandrel plate 29. This plate 56 having the ribbed or threaded face is adjusted with relation to the mandrel plate 29 so that the ribs upon the stationary plate and mandrel will co-operate to form the thread in the cap. As the thread is formed by passing between the plates 29 and 56 of the third die section the wired edge will be curled into the finished rolled or wire edge by passing through the groove 57—58, the curved bottom of which is at a smaller distance from the mandrel than the corresponding groove in the preceding die section. It will be seen that, as the wire edge of the cap is curled into its finished condition by the groove in this third die section, it will closely fit the groove in that section so that the skirt of the cap will be prevented from being drawn up or shrinking axially of the cap when the threads are simultaneously formed. This insures accuracy of the formation of the cap inasmuch as the wire edge is held in an accurately defined position, whereas if it were not so held it might be drawn up to different degrees along the axis of the cap thereby producing uncertainty and inaccuracy in the formation of the lower edge of the cap. On emerging from the third and last stationary die section the cap will be formed and, passing on in the rotation of the mandrel carriage, will be lifted from the mandrel and discharged from the chute as previously described.

Each mandrel should make at least one complete revolution in passing each die section.

The stationary thread section 101 finishes the upper end of the cap thread and provides the portion 102 which overlaps the lower thread end (see Fig. 13).

While the invention has been illustrated in what is considered its best application, it may be embodied in other structures without departing from its spirit and is not therefore limited to the structures shown in the drawings.

What I claim is:

1. In an apparatus of the class described, means for forming screw caps, said means comprising rotatable mandrels having die members for shaping the skirts of the cap blanks, co-operative die members held stationary and located in relation to said mandrel die members and an adjusting device for regulating the distance between the faces of the rotary and the stationary die members, said adjusting device comprising a rotatable eccentric facing said stationary die members for moving of same and means for securely locking said eccentric after a regulation thereof.

2. An apparatus of the class described comprising a stationary shaft having its axis horizontal, a mandrel-supporting carriage rotatable on said shaft about said horizontal axis, mandrels rotatable mounted in said carriage, means for rotating said carriage, a plate fixedly mounted on said shaft adjacent to said carriage, the periphery of said plate having gear teeth, gears upon the individual mandrels and engaging with the said teeth upon said plate to individually rotate said mandrels as said carriage is rotated, means for guiding the cap blanks toward said mandrels by force of gravity, further means for successively feeding blanks to each one of said mandrels and means for thereafter forming screw threads in and forming said blanks into finished screw caps, said feeding and guiding means for said cap blanks presenting the blanks to downwardly moving mandrels.

3. An apparatus of the class described comprising a stationary shaft having its axis horizontal, a mandrel-supporting carriage rotatable on said shaft about said horizontal axis, mandrels rotatably mounted in said carriage, means for rotating said carriage, a plate fixedly mounted on said shaft adjacent to said carriage, the periphery of said plate having gear teeth, gears upon the individual mandrels and engaging with the said teeth upon said plate to individually rotate said mandrels as said carriage is rotated, means for guiding the cap blanks toward said mandrels by force of gravity, further means for successively feeding blanks to each one of said mandrels and means for thereafter forming screw threads in and forming said blanks into finished screw caps, said feeding and guiding means presenting each cap blank at an oblique angle to the plane of movement of the carriage whereby each mandrel engages the inside of the blank at one side to positively draw the blank from the feeding means on to the mandrel, said feeding and guiding means for said cap blanks presenting the blanks to downwardly moving mandrels.

4. An apparatus of the class described comprising a stationary shaft having its axis horizontal, a mandrel-supporting carriage rotatable on said shaft about said horizontal axis, mandrels rotatably mounted in said carriage, means for rotating said carriage, a plate fixedly mounted on said shaft adjacent to said carriage, the periphery of said plate having gear teeth, gears upon the individual mandrels and engaging with the said teeth upon said plate to individually rotate said mandrels as said carriage is rotated, means for guiding the cap blanks toward said mandrels by force of gravity, further means for successively feeding blanks to each one of said mandrels and means for thereafter forming screw threads in and forming said blanks into finished screw caps, said feeding and guiding means presenting each cap blank at an oblique angle to the plane of movement of the carriage whereby each mandrel engages the inside of the blank at one side to positively draw the blank from the feeding means on to the mandrel, said feeding and guiding means for said cap blanks presenting the blanks to downwardly moving mandrels, said guiding and feeding means being laterally outside said carriage in a horizontal direction.

AUGUSTUS L. MEROLLE.